United States Patent [19]

Lang et al.

[11] 4,112,057

[45] Sep. 5, 1978

[54] PROCESS FOR PURIFYING HALOGENOSILANES

[75] Inventors: Winfried Lang; Dietrich Schmidt, both of Burghausen; Johann Hofer, Kirchdorf; Rudolf Pachnek, Raitenhaslach; Heinz-Jörg Rath, Burghausen, all of Fed. Rep. of Germany

[73] Assignee: Wacker-Chemitronic Gesellschaft fur Elektronik-Grundstoffe mbH, Burghausen, Fed. Rep. of Germany

[21] Appl. No.: 732,269

[22] Filed: Oct. 14, 1976

[30] Foreign Application Priority Data

Oct. 20, 1975 [DE] Fed. Rep. of Germany ....... 2546957

[51] Int. Cl.$^2$ .............................................. C01B 33/08
[52] U.S. Cl. ..................................... 423/342; 423/96; 423/494
[58] Field of Search .......................... 423/342, 494, 96

[56] References Cited

U.S. PATENT DOCUMENTS

| | | | |
|---|---|---|---|
| 2,812,235 | 11/1957 | Winslow | 423/494 X |
| 3,252,752 | 5/1966 | Pohl et al. | 423/342 |
| 3,540,861 | 11/1970 | Bradley et al. | 423/342 |

FOREIGN PATENT DOCUMENTS

| | | | |
|---|---|---|---|
| 1,028,543 | 4/1958 | Fed. Rep. of Germany | 423/342 |
| 877,477 | 9/1961 | United Kingdom | 423/342 |
| 925,143 | 5/1963 | United Kingdom | 423/342 |

*Primary Examiner*—Jack Cooper
*Attorney, Agent, or Firm*—Allison C. Collard

[57] ABSTRACT

Halogenosilanes and halogenogermanes which are contaminated by a boron-containing impurity are purified by treatment with an effective amount of a hydrated metal oxide or a hydrated silicate containing from about 3 to about 8% by weight of water, and then distilling the treated halogenosilane or halogenogermane at a temperature about 3° to about 15° C above its boiling temperature, and at atmosphere pressure.

4 Claims, 1 Drawing Figure

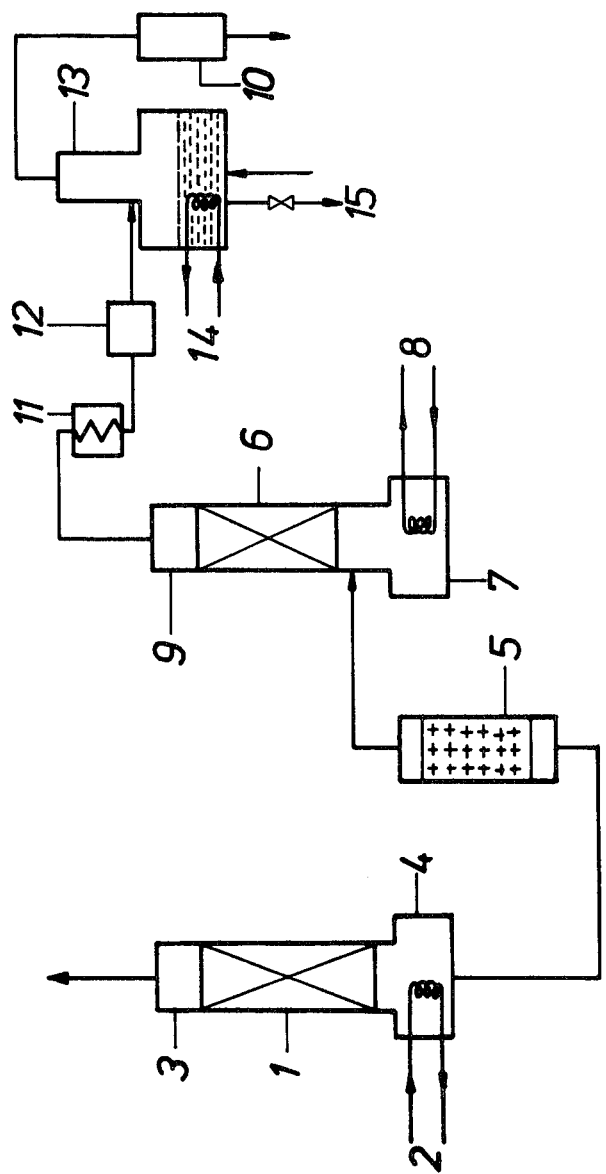

PROCESS FOR PURIFYING HALOGENOSILANES

The subject of the invention is a process for purifying halogenosilanes containing impurities, especially boron-containing impurities, by treating the starting material, present in liquid phase, with hydrated oxides or silicates and subsequently distilling it.

The production of silicon for semiconductor purposes, which is normally effected by decomposition of its volatile halogen compounds, such as trichlorosilane for example, requires the purest starting products possible, since impurities, such as in particular boron, arsenic or phosphorus, would dope in an undesirable manner the silicon deposited. Boron creates the greatest difficulties since owing to its distribution coefficients of about 0.8 it can practically never be removed from the silicon by crucible-free zone melting.

The attempts to overcome this problem have been reflected in numerous patent applications and almost all of them come back to the known fact that hydrolyzable boron compounds hydrolyze more quickly than comparable silicon compounds. Thus, for example according to the process of DT-AS No. 1,028,543, a small amount of water is added to the silicon halide to be purified and the reaction product is subjected to a subsequent fractional distillation. According to DT-AS No. 1,074,560, the small amount of water is added in fine distribution in a solvent for the silicon halide or in an inert gas, whereas according to the process of DT-AS No. 1,046,582, this addition of water is undertaken at an elevated temperature, and in particular just below the boiling point of the silicon halide in question. On the other hand, according to the Austrian Pat. No. 221,477, which describes a process for the production of silicon by decomposition of silane, the silane gas is heated with the amount of water required for the hydrolysis of the boron compounds to at least the decomposition temperature of the silane.

The processes listed above lead to a more or less strong n-doping of the semiconductor material deposited, however, for example by the phosphorus dissolved from the steel of the distillation columns by the acid produced during the hydrolysis.

With the process according to DT-AS No. 1,154,796 this drawback is overcome to a large extent by treating the silicon compound which is to be purified in the liquid phase with hydrated oxides or silicates, in which the boron impurities are retained in complex form. The disadvantage of this process is, however, that it is unsuitable for continuous operation since the oxides and silicates, such as alumina or silica gel for example, must first of all be activated at 270° C. for 16 hours in each case before use. A further disadvantage from which all known processes suffer is that the partially hydrolyzed or complexed, relatively involatile boron compounds are partly carried over from the starting material, and during operation on an industrial scale decompose again on the evaporator surfaces, which are usually heated with superheated steam, into readily volatile components which then distill off together with the halogenosilane to be purified.

Such disadvantages in the purification of halogenosilanes containing impurities, especially boron-containing impurities are now overcome according to the present invention by treating the halogenosilanes to be purified with hydrated oxides or silicates having a content of free water of from 3 to 8% by weight, and by distilling them at a temperature of the heat-exchanger surfaces which is only slightly above the boiling point of the relevant halogenosilane.

The operating sequence of the process of the invention is explained in more detail below with reference to the accompanying drawing.

The unpurified halogenosilane, for example trichlorosilane obtained by reacting hydrogen chloride with silicon, which silane contains among other things boron trichloride and, on account of an ever present residual moisture within the system, contains hydrolyzed boron complexes, is fed to the separating column 1. Contrary to the conventional method, however, the column is not heated with super-heated steam, but with hot water of a temperature advantageously no higher than 50° C., and preferably 3° to 15° C. above the boiling point of the relevant halogenosilane, and for example in the case of trichlorosilane, preferably from 35° to 50° C.

Although the trichlorosilane, the boiling point of which is about 32° C., is heated to boiling, the boron complexes with high boiling points, present from the production are not decomposed owing to the substantially lower surface temperature of the heat-exchanger surfaces 2. Whereas the low-boiling boron trichloride is drawn off via the head 3 of the column, the liquid trichlorosilane is drawn out of the still 4 and conveyed to an adsorbing station 5 with the high-boiling boron compounds, and, if necessary, the incompletely separated boron trichloride.

The adsorbing station 5 is filled with hydrated metal oxides or hydrated silicates, to which there is added, at intervals, sufficient water each time so that they always contain 3 to 8% by weight, preferably 4 to 6% by weight, of free water, by which water which is not bound in the form of a complex is to be understood. Alumina gel, titanium dioxide gel, iron oxide gel, magnesium hydroxide, diatomaceous earths or, preferably, silicic acid gel, for example, may be used as hydrated oxides or silicates. The high-boiling boron complexes are adsorbed on this material, while boron trichloride is hydrolyzed and complexed. The high-boiling boron complexes passing over into the distillation column 6 partly with liquid trichlorosilane, may easily be drawn off via the still 7 since decomposition of the boron complexes cannot occur at the heat exchanger surfaces 8, which are likewise heated merely with hot water instead of with the otherwise usual superheated steam, the temperature of the hot water being no higher than 50° C. and preferably being from 3° to 15° C. above the boiling point of the relevant halogenosilane, so that the halogenosilane for example, trichlorosilane, drawn off via head 9, is of the highest purity and no longer contains any boron.

To convey the purified, gaseous trichlorosilane to the silicon depositing reactor, it is first recondensed in the condenser 11 and advantageously introduced into the saturator 13 via a supply tank 12. The trichlorosilane flowing into the saturator 13 is heated with a heating coil through which hot water flows, the temperature of the hot water likewise advantageously being no higher than 50° C., and preferably 3° to 15° C. above the boiling point of the trichlorosilane or in general of the corresponding halogenosilane. Apart from this, there is additionally introduced into the saturator 13 hydrogen which bubbles through the liquid trichlorosilane and is charged with trichlorosilane in so doing. The trichlorosilane/hydrogen mixture leaving the saturator 13 is then fed to the depositing reactor 10 while any residues which may possibly remain are discharged via the outlet 15. The heat-exchanger surfaces heated with hot water and used in the process must be designed with a correspondingly larger surface area as compared with conventional heating coils operated with superheated steam in order to impart to the halogenosilane the energy required for evaporation.

The size of the evaporator surfaces is dependent on the temperature of the hot water. The lower the temperature, above the boiling point of the halogenosilane to be purified, generally the greater the purification effect to be expected.

The process according to the invention, preferably carried out for the purification of boron-containing trichlorosilane in the continuous method described above, may also, of course, be carried out discontinuously and is well suited in a similar manner for the purification of other halogenosilanes as well as halogenogermanes, such as, for example, $SiCl_4$, $SiH_2Cl_2$, $Si_2Cl_6$ or $GeCl_4$.

The use of free water-containing, non-activated, hydrolyzed oxides and silicates as adsorbents leads to a considerable reduction in the reaction time compared with the known process according to DT-AS No. 1,154,796. The distillation of the halogenosilane with heat-exchangers, the temperature of which according to the invention is only slightly above the boiling point of the halogenosilane, does not result in decomposition of high-boiling boron complexes and thus leads to extremely pure halogenosilane. With the halogenosilane purified according to the invention, it is possible to deposit p-type silicon with a boron level of more than 35,000 $\Omega$ cm.

The following examples illustrate the practice of the invention, but are not to be regarded as limiting:

EXAMPLE A

No treatment

A commercially available, crude trichlorosilane was evaporated at atmospheric pressure in an evaporator operated with superheated steam at 120° C., hydrogen being additionally fed into the evaporator. The gas mixture, consisting of trichlorosilane, and hydrogen leaving the evaporator was then conveyed to a silicon depositing reactor. Subsequently, the silicon deposited from this mixture was zone pulled several times, under a vacuum, according to the crucible-free zone pulling process, as a result of which all dopants, except boron, were substantially removed from the silicon. The specific resistance of the rod was p-type and 230 $\Omega$ cm.

EXAMPLE B

No treatment

Trichlorosilane, as used in Example A, was distilled at atmospheric pressure in a distillation column heated with hot water having a temperature of 35° C., and then fed to a evaporator, likewise operated with hot water vapor heated to 120° C., hydrogen being additionally fed into the evaporator in the same manner. The silicon deposited from the gas mixture and zone pulled according to Example A, had a specific p-type resistance of 4,800 $\Omega$ cm.

EXAMPLE C

Treatment with Silica Gel

Trichlorosilane, as used in Example A, was passed under pressure through an adsorption column filled with silica gel containing 6% by weight of free water, subsequently distilled at atmospheric pressure in a distillation column heated with hot water having a temperature of 35° C. and fed to a saturator likewise heated with hot water having a temperature of 35° C., hydrogen being additionally fed into the saturator. The silicon deposited from the gas mixture and zone pulled according to Example A, had a specific p-type resistance of 35,000 $\Omega$ cm.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the purification of halogenosilanes or halogenogermanes contaminated by a boron-containing impurity, comprising the steps of:
   (a) passing the impure halogeno compounds, in the liquid state, through an adsorption column containing an effective amount to remove said impurity of a hydrated metal oxide or a hydrated silicate selected from the group consisting of alumina gel, titanium dioxide gel, iron oxide gel, magnesium hydroxide, diatomaceous earths and silicic acid gel, said oxide or silicate containing, in addition to that water bound in the form of a complex, from about 3 to about 8% by weight free water;
   (b) distilling the treated halogeno compound exiting said adsorption column, at atmospheric pressure and at a temperature about 3° to about 15° C. above the boiling temperature thereof; and
   (c) recovering the purified halogeno compound.

2. The process of claim 1 in which the halogeno compound purified is a halogenosilane.

3. The process of claim 2 in which the halogenosilane is trichlorosilane.

4. The process of claim 2 in which said impure halogeno compound is passed through an adsorption column containing silicic acid gel having a free water content of about 4 to about 6% by weight.

* * * * *

UNITED STATES PATENT OFFICE
CERTIFICATE OF CORRECTION

Patent No. 4,112,057    Dated Sep. 5, 1978

Inventor(s) LANG ET AL

It is certified that error appears in the above-identified patent and that said Letters Patent are hereby corrected as shown below:

Column 3, lines 33 and 51, after "∩", insert --/--. Column 4, line 6, after "∩", insert --/--.

Signed and Sealed this

Twenty-fourth Day of April 1979

[SEAL]

Attest:

RUTH C. MASON
Attesting Officer

DONALD W. BANNER
Commissioner of Patents and Trademarks